United States Patent [19]

Streich et al.

[11] Patent Number: 4,488,627
[45] Date of Patent: Dec. 18, 1984

[54] ELECTROMAGNETIC TWO-STAGE CLUTCH

[75] Inventors: Gerhard Streich, Stuttgart; Karl-Ernst Hummel, Altbach, both of Fed. Rep. of Germany

[73] Assignee: Suddeutsche Kuhlerfabrik Julius Fr. Behr GmbH & Co. KG, Fed. Rep. of Germany

[21] Appl. No.: 299,108

[22] Filed: Sep. 3, 1981

[30] Foreign Application Priority Data

Sep. 3, 1980 [DE] Fed. Rep. of Germany ....... 3033140

[51] Int. Cl.³ .................... F16D 27/12; F16D 27/10
[52] U.S. Cl. .................. 192/48.2; 192/84 AA; 192/84 AB; 192/84 C; 74/73
[58] Field of Search .......... 192/84 C, 84 AA, 84 AB, 192/48.2; 474/73, 74, 75, 76, 86, 169; 62/323.4; 417/362, 319

[56] References Cited

U.S. PATENT DOCUMENTS

| 2,825,233 | 3/1958 | Jacobs | 192/84 AA |
| 2,851,865 | 9/1958 | Jacobs | 192/84 AB |
| 3,048,056 | 8/1962 | Wolfram | 474/74 X |
| 3,675,747 | 7/1972 | Obermark | 192/48.2 |
| 3,995,244 | 11/1976 | Sayo | 192/84 C X |
| 4,259,810 | 4/1981 | West | 474/86 X |

FOREIGN PATENT DOCUMENTS

| 2341208 | 2/1975 | Fed. Rep. of Germany. | |
| 0018502 | 2/1977 | Japan | 192/84 C |
| 0119229 | 9/1980 | Japan | 192/84 C |

Primary Examiner—Rodney H. Bonck
Assistant Examiner—David D. House
Attorney, Agent, or Firm—Craig & Burns

[57] ABSTRACT

An electromagnetic two-stage clutch for the driving of units, especially refrigerant compressors in motor vehicles. The clutch includes electromagnets and a drive disk. The drive disk is adapted to be frictionally engaged by driving a shaft of the unit with the aid of electromagnets through armature disks, selectively, by two pulleys of differing diameters. The pulleys are connected with a counter pulley by way of V-belts. The drive disk is mounted in a supported fashion in a neck of the unit and is arranged between the two pulleys. One pulley is supported on the outside or outer surface of the neck of the unit.

16 Claims, 4 Drawing Figures

ELECTROMAGNETIC TWO-STAGE CLUTCH

The present invention relates to a clutch arrangement and, more particularly, to an electromagnetic two-stage clutch for the driving of units, especially refrigerant compressors in motor vehicles, with the clutch including electromagnets and a frictionally engageable drive disk for driving a shaft of a unit, by way of electromagnets through armature disks, selectively, by two pulleys of differing diameters, and with the pulley being connected with a counter pulley by way of V-belts.

Electromagnetic two-stage clutches of the aforementioned type have been proposed and have been utilized with the powering units in motor vehicles or in machine tools. For example, in Offenlegungsschrift No. 2,341,208, a clutch is proposed wherein a driver or dog is mounted to the shaft of a compressor, with one of the two existing pulleys being directly supported on the driver or dog and the other pulley being supported by the first pulley. The magnets are fixedly attached to the compressor housing and can establish the connection between the pulleys and the driver or dog by way of friction rings.

A disadvantage of the above-proposed clutch construction resides in the fact that such two-stage clutches or couplings are relatively heavy and must be of a relatively large size, inasmuch as the arrangement of the two pulleys occupies a relatively large amount of space. Thus, the possibilities for mounting such a two-stage clutch to the unit are greatly limited from a space point of view.

A further disadvantage of the above-proposed clutch construction resides in the fact that the drive disks are held directly on the shaft of the unit so that a stress is exerted on the shaft, with the stress impairing the lifetime of the shaft as well as the clutch itself.

The aim underlying the present invention essentially resides in providing a two-stage clutch which occupies less space as compared with previously proposed clutches as well as a clutch wherein the stress on the shaft and wear and tear effects are minimized.

In accordance with advantageous features of the present invention, a drive or carrier disk or plate is mounted in a supported fashion in a neck of the unit and is arranged between the two pulleys. One of the pulleys is located on the outside of the neck of the unit.

By virtue of the above-noted features of the present invention, considerable space may be saved because the drive disk may be located within a periphery of the outer pulley. One pulley may be mounted directly on a neck of a unit such as, for example, a compressor, with the other pulley being mounted on an extension which may be formed on the drive disk concentrically to the axis of the shaft so that the actual drive component then lies between the two pulleys.

In accordance with the present invention, the drive disk is connected to rotate with the shaft and is additionally supported within the periphery of the compressor neck by way of a roller bearing or the like. While this arrangement means that the drive disk must accommodate the small pulley, an advantage of such arrangement resides in the fact that the additional bearing within the compressor neck makes it possible to absorb the belt pull of the small pulley as well as the vibrations and unbalance of the masses seated on the shaft, so as to preserve or lengthen the lifetime of the shaft.

Advantageously, the large pulley is supported on an outside of the neck of the unit and the small pulley is supported on an extension of the drive component.

The frictional engagement of the drive part with the two pulleys takes place, and in accordance with the present invention, by way of armature disks which may be arranged so that the armature disk for the large pulley is mounted to the drive disk and the armature disk for the small pulley is attached to the small pulley proper. The armature disk may be mounted in a conventional manner by way of diaphragm springs which are pretensioned so as to ensure that when one pulley is in frictional engagement the other pulley is respectively in a freewheeling condition.

It is especially advantageous if the shape of the large pulley is adapted to a contour of the magnetic body or element and the drive disk is extensively adapted to the contour of the large pulley so that, on the one hand, the paths for the magnetic flux emanating from the electromagnets are guided in such a way that an extensive flow through the armature disks is ensured and, moreover, a space lying between the two pulleys can be kept at a small size.

In accordance with other advantageous features of the present invention, the large pulley is preferably constructed of two-pulley halves, wherein one pulley half is mounted on the neck of the unit by means of dual bearings and the other pulley half is supported within the extensions of the drive disk thereby resulting in the two pulleys extending in one plane, wherein the small pulley is arranged within the large freewheeling and bipartite pulley. One half of the large pulley may be supported within the drive element extension and the other half can be mounted on the compressor neck and, by way of the other half, the drive action may be effected through the drive disk. The other half of the large pulley in this construction may serve merely for supporting and guiding the V-belt.

In the construction of the present invention, the drive disk may extend between the half of the large pulley supported at the compressor neck and the small pulley.

Advantageously, in accordance with the present invention, the belt grooves of the pulleys are arranged in one plane concentrically to each other.

In accordance with still further features of the present invention, the counterpulley which is connected with the pulleys of the clutch by way of the V-belts may include two belt grooves arranged one inside the other in the same belt plane so that two different transmission or gear stages are made possible in one belt plane.

The bearings for the pulleys of the clutch of the present invention may advantageously be mounted by means of fishplates punched out in the pulleys and bent at an angle after an assembly of the bearings, thereby providing a simple possibility for an axial fixation of the bearings.

Accordingly, it is an object of the present invention to provide an electromagnetic two-stage clutch which avoids, by simple means, shortcomings and disadvantages encountered in the prior art.

Another object of the present invention resides in providing an electromagnetic two-stage clutch which is relatively light weight and of a relatively small size to thereby require a minimum amount of installation space.

Another object of the present invention resides in providing an electromagnetic two-stage clutch which minimizes the occurrence of stress on the shaft of the unit driven by the clutch.

A still further object of the present invention resides in providing an electromagnetic two-stage clutch which minimizes the wear and tear on the components thereof so as to increase the over-all lifetime of the clutch and unit associated therewith.

Yet a further object of the present invention resides in providing an electromagnetic two-stage clutch which functions reliably under all operating conditions.

Another object of the present invention resides in providing an electromagnetic two-stage clutch which is simple in construction and therefore relatively inexpensive to manufacture.

These and other objects, features, and advantages of the present invention will become more apparent from the following description when taken in connection with the accompanying drawings which show, for the purposes of illustration only, several embodiments in accordance with the present invention, and wherein.

Figure 1:
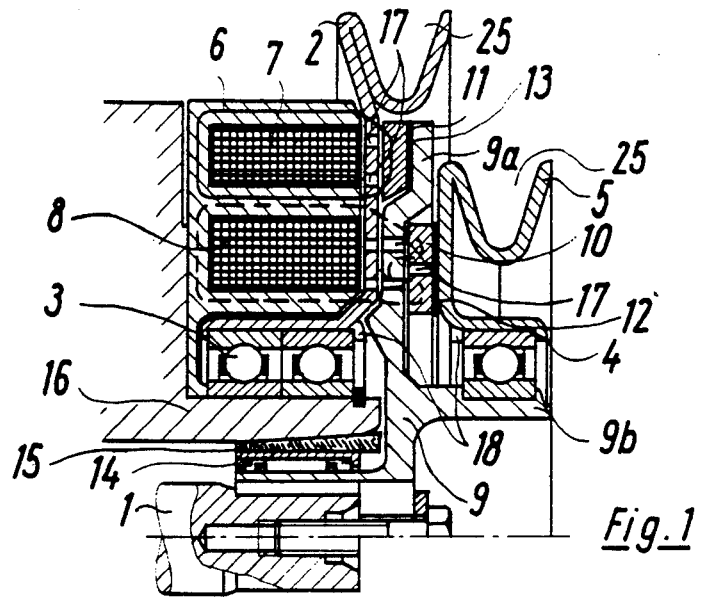
FIG. 1 is a partial cross-sectional view of an electromagnetic two-stage clutch constructed in accordance with the present invention.

Referring now to the drawings wherein like reference numerals are used throughout several views to designate like parts, and more particularly, FIG. 1, according to this figure, a compressor housing includes a compressor neck 16 on which the two-stage clutch of the present invention is partially mounted. The two-stage clutch includes two pulleys 2, 5 between which a drive part 9a of the drive disk 9 is arranged.

A magnet body 6 is attached to the compressor, with the magnet body being equipped with two magnet or field coils 7, 8. The field coils 7, 8 are traversed by an electric current in a conventional manner not shown in detail for switching the drive from one pulley to the other pulley. Electric current builds up a magnetic field which cooperates with armature disks 10, 11.

In the construction of FIG. 1, the compressor bears the weight of the relatively heavy magnet body 6 and magnet coils 7, 8. A shaft 1 extends within the neck 16 of the compressor, with the shaft 1 being nonrotatably joined to the drive disk 9. The large pulley 2 is supported on the compressor neck 16 by way of dual bearings 3, and, consequently, cannot place any load on the shaft 1.

The small pulley 5 is supported through a bearing 4 on an extension 9b of the drive disk 9; therefore, the shaft 1, even though accommodating the drive disk 9 and the small pulley 5, is relieved from the belt pull occurring at the pulley as well as from the vibrations or any unbalance, all of which can be absorbed by a supporting bearing 14 by means of which the drive disk 9 is mounted at the inner periphery of the compressor neck 16. Since the above-noted vibrations, as well as the belt pull, are not transmitted directly to the shaft 1, a relatively long lifetime can be obtained for the shaft 1.

The large pulley 2 is arranged so that it extends in front of the magnetic coils 7, 8 with a small air gap being maintained between the magnetic coils 7, 8 and the pulley 2 and/or between the pulley 2 and the drive part 9a or the armature disk, respectively, for the purpose of obtaining a free movement of the large pulley 2 with respect to the electromagnetic coils 7, 8 or the drive part 9a, respectively. To enable an increase in the penetration of the magnetic field lines or lines of flux, interruptions 17 are provided in the large pulley 2 in a conventional manner.

The drive part 9a, extending between the small pulley 5 and the large pulley 2, is in a plane beneath the groove for accommodating the V-belt (not shown) of the large pulley 2, is fashioned so as to be bent at an angle so that it exhibits, in an upper zone thereof, an axial spacing from the large pulley 2. The armature disk 11 is connected by way of diaphragm springs 13 to the drive part 9a. The armature disk 10 as well as the diaphragm springs 12 for the small pulley 5 are attached to the small pulley 5 proper and establish, when the electromagnetic coil 8 is excited by an electric current, the frictional connection between the drive part 9a and the small pulley 5.

In order to enhance the attractive force between the armature disk 10 and the electromagnetic coil 8, interruptions or perforations 17 are also provided in the drive part 9a and in the armature disk 10 so as to enable and improve penetration of the magnetic field lines or lines of flux. The diaphragm springs 12, 13 are pretensioned so as to ensure, in case of the respective electromagnetic coils 7 or 8 are not traversed by an electric current, either the small pulley 5 or the large pulley 2 to execute a freewheeling action.

A clutch of FIG. 1 may be built in a very compact fashion since, above all, the drive disk 9 may be arranged in a plane within the large pulley 2. This arrangement is made possible by virtue of the fact that the large pulley 2 is supported on the outside at the neck 16 of the compressor, within the magnet body 6. The space present within the pulley 2 can thus be utilized.

Figure 2:
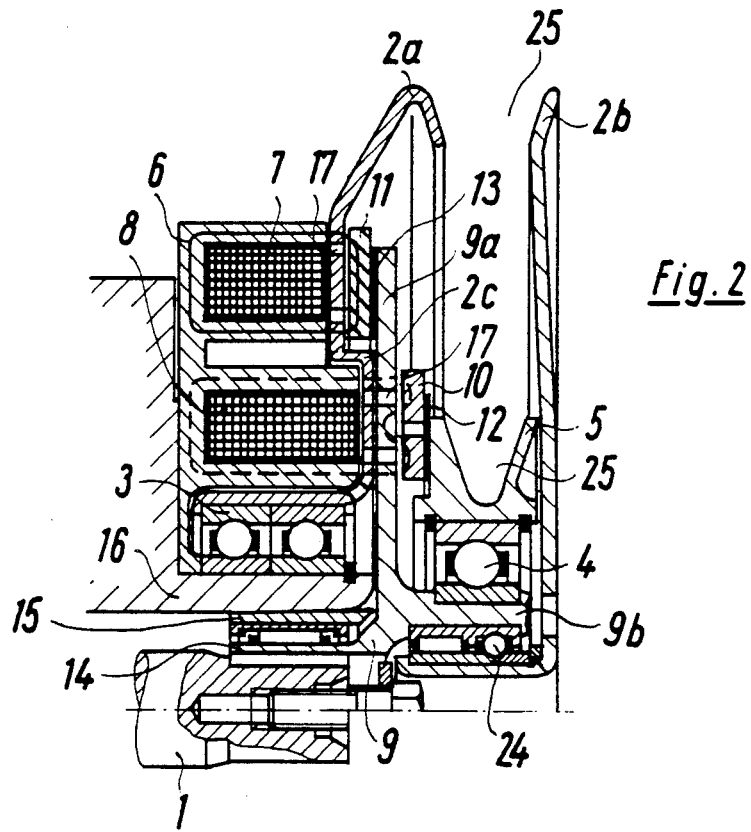
FIG. 2 is a partial cross-sectional view of another embodiment of an electromagnetic two-stage clutch constructed in accordance with the present invention.

FIG. 2 provides another example of a further embodiment of the present invention which is also advantageous and provides for a compact two-stage clutch construction wherein the two pulleys are formed in one plane. As shown in FIG. 2, a large pulley is formed of two pulley halves 2a, 2b with an actual drive action being effected by way of the pulley half 2a. The pulley half 2b normally serves for securing and guiding a V-belt (not shown) and, for this purpose, the pulley half 2b is supported through a bearing 24 within an extension 9b of the drive disk 9.

The second pulley half 2a is supported, in a manner similar to the construction of FIG. 1, at the compressor neck 16 by way of the bearings 3 so as to prevent a stressing of the shaft 1. In a vertical extension, the pulley half 2a is adapted to a contour of the magnet body 6 and the electromagnetic coils 7, 8 in such a way that there will, in each case, be only a narrow gap between the electromagnetic coils 7, 8 and the pulley half 2a. If in the arrangement of FIG. 2 the magnetic coil, which has a larger spacing from the shaft 1 in a radial direction, is made to be somewhat smaller in length than the coil 8, lying further downwardly, then the pulley half 2a has an angled portion 2c in a zone or area between the two electromagnetic coils 7, 8 thereby making it possible to fashion the drive part 9a as a disk. In this situation, the armature disk 11 and the diaphragm springs 13 are then, in turn, connected to the drive part 9a in the external zone or area thereof and establish a frictional engagement if the electromagnetic coil 7 is traversed by an electric current.

As shown in FIG. 2, the small pulley 5 is again supported through a bearing 4 on extension 9b of the drive disk 9, with the drive disk 9 otherwise having the same construction as that shown in FIG. 1. The drive disk 9 is, in turn, supported through a bearing 14 and reducing ring 15 on the neck 16 of the compressor thereby resulting in an arrangement which is likewise very compact and avoids excessive straining of the shaft 1.

For the construction of the electromagnetic clutch of FIG. 1, belt grooves 25 of the pulleys 2, 5 are disposed concentrically to each other but axially spaced; however, with the construction of FIG. 2, the belt grooves 25 are arranged in one plane concentrically to each other.

Figure 3:
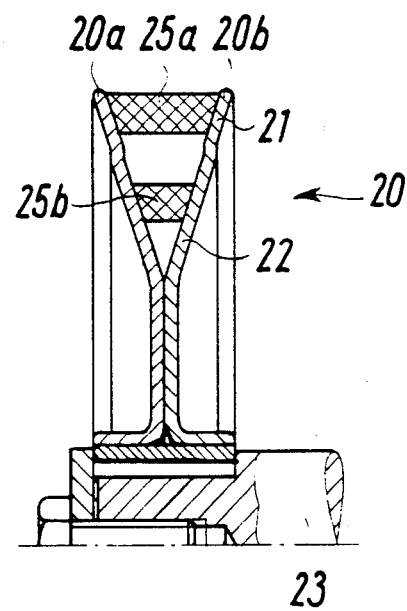
FIG. 3 is a partial cross-sectional view of a counter pulley constructed in accordance with the present invention.

As shown in FIG. 3, the two pulleys 2, 5 are connected with each other through normal V-belts and wide V-belts with a counter pulley generally designated by the reference numeral 20 which, in accordance with the present invention, is constructed so that the two belts 25a, 25b are held in a plane perpendicular to an axis of a shaft 23. For this purpose, the counter pulley 20 is formed of two halves 20a, 20b mounted on the common shaft 23. The counter pulley defines two belt grooves 21, 22 arranged one within the other in the same belt plane. In the external zone of the counter pulley, the two pulley halves 20a, 20b are bent away from each other so as to form a mutual angle and serve for accommodating the inner as well as the outer V-belts 25b, 25a, respectively; therefore, the very space-saving drive arrangement may be obtained together with the clutch.

Figure 4:
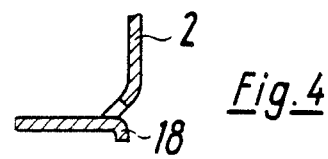
FIG. 4 is a cross-sectional view, on an enlarged scale, of a pulley constructed in accordance with the present invention provided with fishplates or clips for enabling an axial fixation of bearings of the clutch.

FIG. 4 provides an example of the manner in which the bearings 3, 4 may be axially secured in position in a very simple and effective fashion. More particularly, as shown in FIG. 4, by punching fishplates, clips, or straps 18 at appropriate locations at the pulleys 2, 5, which fishplates 18, after an assembly of the bearings 3, 4, need only be bent over, it is possible to obtain a secure axial seating of the bearings 3, 4.

While we have shown and described several embodiments in accordance with the present invention, it is understood that the same is not limited thereto but is susceptible of numerous changes and modifications as known to one of ordinary skill in the art, and we therefore do not wish to be limited to the details shown and described herein, and intend to cover all such modifications as are encompassed by the scope of the appended claims.

We claim:

1. An electromagnetic two-stage clutch for driving units having a drive shaft, the clutch comprising driver means operatively connected to the drive shaft, means for frictionally engaging the driver means, electromagnetic means for actuating the engaging means, and two pulley means cooperable with the driver means, the engaging means includes armature disk means associated with the respective two pulley means, and the two pulley means are of two different diameters, said driver means is mounted and supported in a neck of the unit at a position between the two pulley means, and one of the two pulley means is supported on an outer surface of the neck of the unit, said driver means includes an extension portion, a larger of the two pulley means is supported on the outer surface of the neck of the unit and the smaller of the two pulley means is supported on the extension portion.

2. An electromagnetic two-stage clutch according to claim 1, wherein the driving unit is a refrigerant compressor means for a motor vehicle.

3. An electromagnetic two-stage clutch according to claim 1, wherein the armature disk means associated with the larger pulley means is attached to the driver means and the armature disk means associated with the smaller pulley means is attached to the smaller pulley means.

4. An electromagnetic two-stage clutch according to claim 3, wherein the electromagnetic means includes a magnetic body, the larger pulley means has a contour corresponding to a contour of the magnetic body, and the driver means is a drive disk having a contour substantially corresponding to a contour of the larger pulley means.

5. An electromagnetic two-stage clutch according to claim 4, wherein the larger pulley means includes two pulley halves, bearing means are provided for mounting one of the pulley halves on the neck of the unit, and the other of the two pulley halves is mounted within the extension portion of the driver means.

6. An electromagnetic two-stage clutch according to claim 1, wherein each of the two pulley means includes groove means for accommodating a driving belt, and the groove means of the two pulley means are arranged concentrically to each other.

7. An electromagnetic two-stage clutch according to claim 6, wherein a further pulley means is provided which is a counter pulley having two groove means for accommodating driving belt means, the two groove means in the counter pulley are arranged in the same belt plane.

8. An electromagnetic two-stage clutch according to claim 1, wherein further bearing means are provided for mounting the other of the two pulley halves within the extension portion of the driver means, and means are provided on the pulley halves for axially fixing the bearing means and the further bearing means.

9. An electromagnetic two-stage clutch according to claim 8, wherein the means for axially fixing includes portions punched out of each of the pulley halves, said portions punched out are adapted to be bent over after assembly of the bearing means and further bearing means to each respective half of the pulley halves.

10. An electromagnetic two-stage clutch according to claim 1, wherein one of the two pulley means includes two pulley halves, bearing means are provided for mounting one of the pulley halves on the neck of the unit, and further bearing means are provided for mounting the other of the pulley halves within the extension portion of the driver means.

11. An electromagnetic two-stage clutch according to claim 1, wherein the electromagnetic means includes a magnet body, the larger of the two pulley means has a contour corresponding to a contour of the magnet body, and the driver means has a contour extensively corresponding to a contour of the larger pulley means.

12. An electromagnetic two-stage clutch according to one of claims 1 or 3, wherein each of the two pulley means includes groove means for accommodating a driving belt, and wherein the groove means of each of the two pulley means is arranged in a common plane and concentrically to each other.

13. An electromagnetic two-stage clutch according to claim 12, wherein a further pulley means is provided which is a counter pulley having two groove means for accommodating driving belt means, the two groove means in the counter pulley are arranged one within the other in the same belt plane.

14. An electromagnetic two-stage clutch according to claim 1, wherein bearing means are provided for supporting one of the two pulley means on the outer surface of the neck of the unit, and further bearing means are provided for supporting the other of the two pulley means on the extension portion of the driver means.

15. An electromagnetic two-stage clutch according to claim 14, wherein means are provided on the two pulley means for axially fixing the bearing means and the further bearing means.

16. An electromagnetic two-stage clutch according to claim 15, wherein the means for axially fixing includes portions punched out of the respective pulley means, said portions are adapted to be bent over after assembly of the bearing means and further bearing means to respective pulley means.

* * * * *